Figure 4:
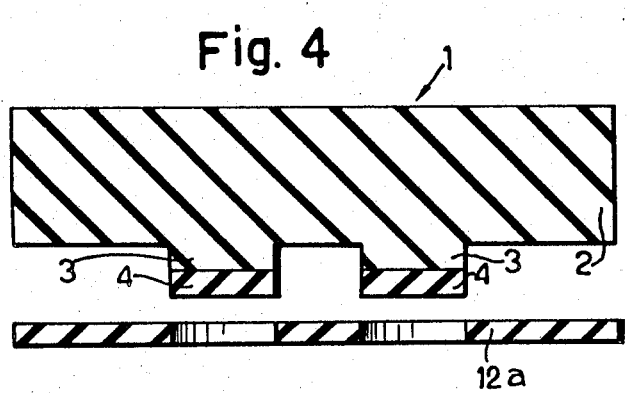

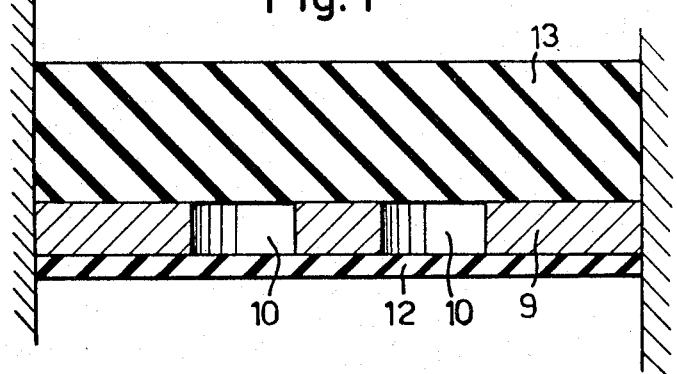
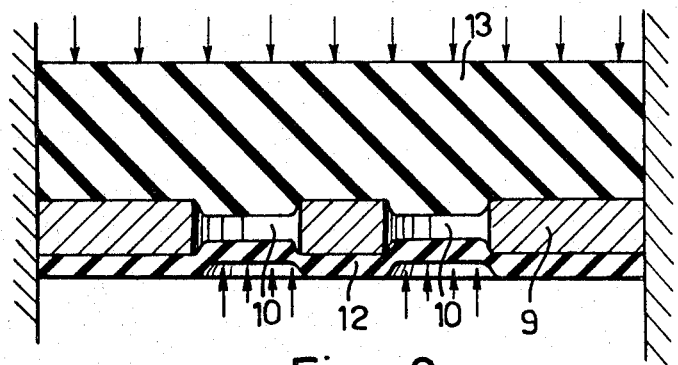
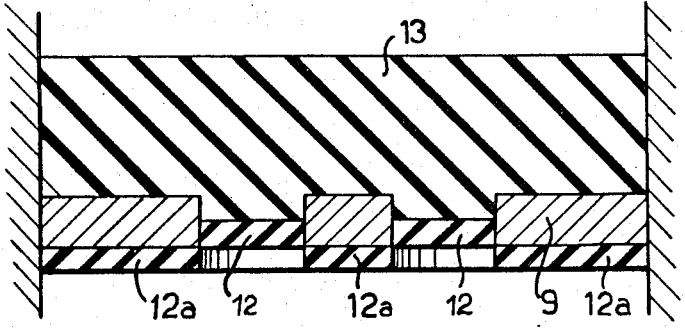

United States Patent Office 3,300,557
Patented Jan. 24, 1967

3,300,557
MANUFACTURING RUBBER SHEETS PROVIDED
WITH A RELIEF PATTERN
Luciano Valentini, Milan, Italy, assignor to Valentini-gomma S.p.A., Turin, Italy
Filed Jan. 3, 1964, Ser. No. 335,474
Claims priority, application Italy, Jan. 11, 1963, 807/63
2 Claims. (Cl. 264—163)

This invention relates to methods of manufacturing sheets of rubber or similar heat-curable material for use as motor vehicle floor coverings, bath-room mats, etc. provided with a relief pattern on their tread side.

It is known to provide in sheets of this type a base layer of rubber which in use of the sheet adheres to the floor. The layer is strong and flexible to suit the floor surface.

The base layer has bonded thereto on its opposite face from the floor a plurality of relief elements of an elastomer material of properties other than the base layer.

By way of example, the relief pattern elements can be, at their top at least, of a colour other than the base layer for decorative purposes or they can be of a hardness and wear-proofness higher than the material of the base layer.

According to a known method the relief pattern elements are manually attached in a desired arrangement on one face of the base layer by employing suitably apertured masks.

According to a further known method a rubber web is initially superposed on the base layer, the web differing in colour from the base layer, whereupon both layers are molded to form on the composite sheet relief elements each of which comprises both the web and the base layer. Subsequently, the web material is removed by abrasion from the relief elements in order to expose throughout the surface of the latter the material of the base layer, leaving the material of the web at the depressed regions only.

This invention provides a method of manufacturing sheets of the above mentioned type which avoids both manual bonding of the relief elements and removal of the material of the second layer (web) from the relief elements.

With this object in view this invention provides a method of manufacturing sheets of rubber or a similar elastomer having on one face relief elements which differ, at their top at least, in properties, from the remaining portions of the sheet, comprising the steps of providing a relatively stiff mask in the form of an apertured plate or stencil matching in plan view the plan view of the desired relief elements on the sheet, in placing on one mask face a base layer of an elastomer material, placing on the other mask face a second layer of elastomer material differing in properties from the base layer, exerting a pressure on the second layer at the openings in the mask while supporting the base layer so that the material of the second layer facing the openings in the mask undergoes a shearing (punching) action along the edges of the openings and enters the openings to come into contact with the material of the base layer which has advanced within the openings, heating the material of both layers in contact to bond them together and stripping from the mask the bonded layers.

Figure 5:
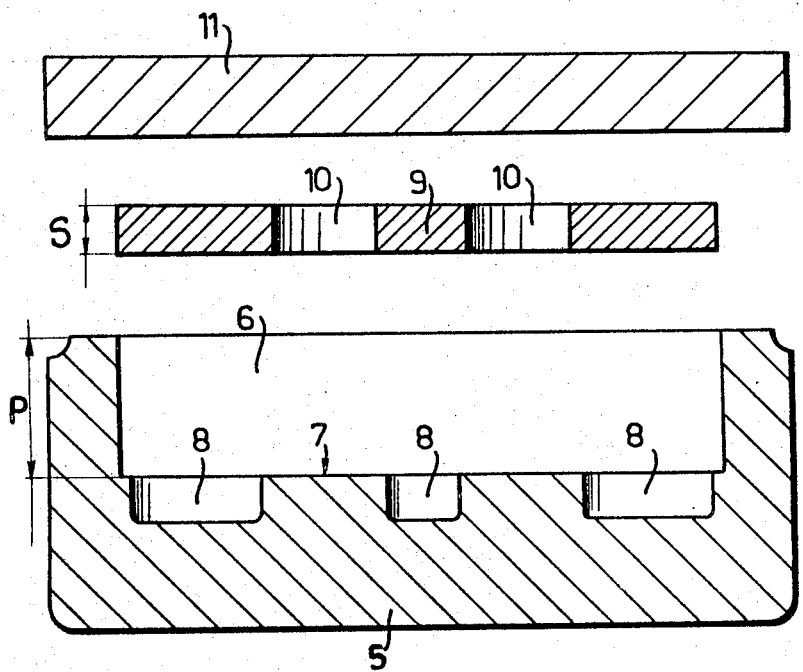
Figure 6:
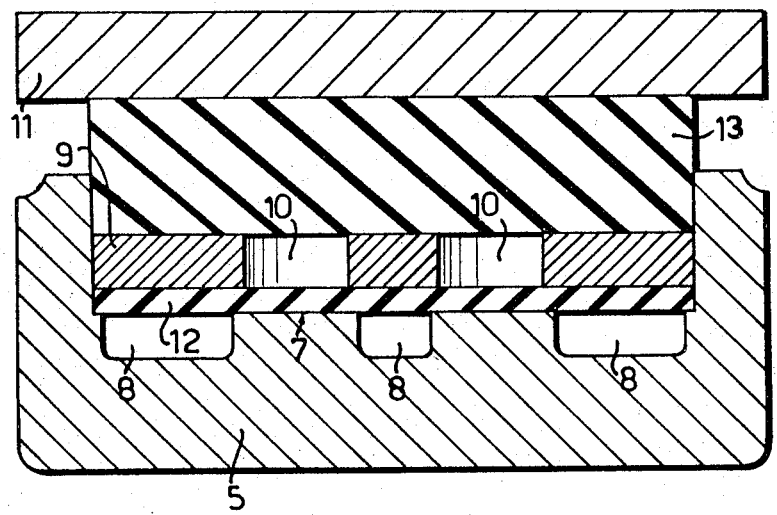
Figure 7:
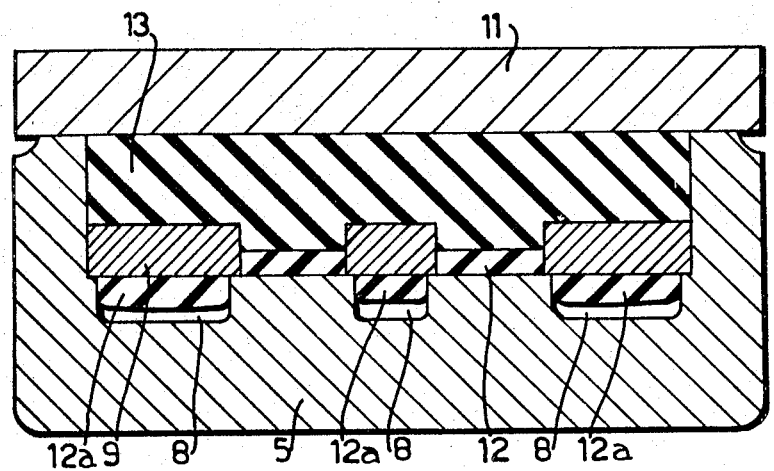

Further characteristic features and advantages of this invention will be understood from the appended detailed description referring to the accompanying drawings given by way of a non-limiting example, wherein:

FIGURES 1 to 4 diagrammatically show the basic steps of the method according to this invention, FIGURE 5 is an exploded sectional view of a mould for carrying out the method according to this invention, FIGURE 6 is a cross sectional view of the mould of FIG. 5 at an initial step of the method according to this invention;

FIGURE 7 is a cross sectional view of the mould at the step preceding stripping of the sheet.

Referring to FIGURE 4 a sheet 1 of rubber or similar elastomer comprises a base layer 2 bearing on one face relief elements 3 each provided at the top with a covering patch 4 of rubber or similar elastomer.

The rubber in the patches 4 differs in properties from the base layer 2, such as by differing in colour.

The sheet 1 is shown here upside down as it is being manufactured; in use, the face of the sheet carrying the relief elements is directed upwardly to form the tread of the sheet.

In order to manufacture the sheet 1 an apparatus is employed which comprises a tray-shaped mould 5 having a cavity 6 with a flat bottom 7. Recesses 8 are formed in the bottom 7 of the cavity 6 and match in plan view the plan view of the pattern of the depressed regions with respect to the relief elements 3 on the sheet 1.

A mask 9 in the form of a steel plate provided with apertures 10 matches in contour the cavity 6 in which the mask 9 can be introduced in a smooth fit.

The thickness S of the mask 9 is smaller than the depth P of the cavity 6 and equals the total desired projection of the relief elements 3 and patches 4 thereon.

The profile of the openings 10 in the mask 9 shows in plan view the plan view of the desired relief elements 3 on the sheet 1.

The arrangement and size of the openings 10 in the mask 9 and of the recesses 8 in the bottom 7 are such that, when the mask 9 is placed on the bottom 7 of the mould 5, the solid areas around the openings 10 in the mask 9 fully cover the recesses 8 and bear on the edges of the "lands" of the bottom 7 by a limited marginal extent around each of the openings 10 and recesses 8.

A cover 11 in the form of a rigid plate closes the cavity 6 in the mould 5.

In order to manufacture the sheet 1 a layer 12 (FIG. 6) of calendered crude rubber matching in thickness and properties the desired thickness and properties of the covering patches 4 on the sheet 1, is placed on the bottom 7 of the mould 5.

The mask 9 is placed on the layer 12 with its solid parts in front of the recesses 8 in the bottom of the mould.

A base layer 13 of calendered crude rubber mix matching in thickness and properties the desired thickness and properties of the base layer 2 on the sheet 1 is placed on the mask 9.

At this stage of the process the mutual arrangement of the layers 12, 13 and the mask 9 is as diagrammatically shown in FIG. 1, in which the layer 12 and layer 13 are placed on opposite faces of the mask 9.

The cover 11 (FIG. 6) is superposed on the layer 13, the mould 5 being thereupon placed into a press (not shown) to effect a relative approach movement of the mould 5 and cover 11.

During the first stage of this movement the bottom 7 of the mould 5 exerts a pressure on the layer 12 causing the portions of the latter layer facing the openings 10 in the mask 9 to enter the opennigs (FIGURE 2).

At the same time the cover 11 acts as a backing for the material in the layer 13 which tends to advance into and through the openings 10.

The force exerted by the bottom 7 of the mould 5 is transmitted through layer 12 to the mask 9 and is concentrated at the margins around the openings 10, so that the layer 12 undergoes along the edges of the openings 10 a shearing action by which the areas of the layer 12 facing the openings 10 are severed from the remaining areas of said layer which are driven into the recesses 8 in the mould 5, FIGURE 7, while the mask 9 comes into contact with the bottom 7 of the mould 5 and seals the recesses 8 in said bottom.

At the end stage of the relative movement of the mould 5 and cover 11 the materials in the layer 12 and in the layer 13 come into contact within and fill the openings 10 in the mask 9 (FIGURES 3 and 7). From a general point of view, the bottom 7 behaves as a multiple punching die cooperating wtih a "matrix" (mask) 9 to punch out patches 4 from the layer 12 and force them into the openings 10 in the matrix where said patches meet the material of the base layer 13.

The mould is now heated to effect by vulcanization bonding of the materials in the layers 12 and 13 in mutual contact.

Stripping is then effected, including the removal of the excess material 12a from the recesses 8, FIGURE 7.

The capacity of the recesses 8 is such that the recesses safely accommodate any excess material from the layer 12 on filling of the openings 10. This safely establishes direct contact of the mask 9 with the bottom 7 of the mould 5 involving the hereinbefore mentioned marginal juxtaposition of the mask 9 and bottom 7.

The compression stress imposed on the mould is concentrated on the juxtaposed margins, inducing a considerable mutual pressure therebetween, which prevents the material in the base layer 13 from flowing towards the recesses 8 and prevents mixing of the material in the layers 12, 13.

Any excess material from the layer 13 due to overfilling or heat expansion during vulcanization escapes through the clearance between the mould 5 and cover 11 where the pressure is lower than the pressure arising at the juxtaposed margins of the mask 9 and bottom 7 around the openings 10 and recesses 8.

What I claim is:

1. Method of manufacturing a sheet of a heat-curable material having a relief pattern on one of its faces, comprising sandwiching a relatively rigid apertured stencil plate between a first layer of heat-curable material and a second layer of heat-curable material differing from the first mentioned material, impressing said second layer into the apertures in the stencil plate while applying a backing pressure to the first layer thereby to punch-out a patch from said second layer into each of said apertures and into contact with the material of said first layer in said apertures, and applying curing heat to said patches and first layer to bond them together.

2. Method of manufacturing a sheet of a heat-curable material having a relief pattern on one of its faces, comprising providing a tray-shaped mould the bottom of which consists of recesses and lands in an arrangement wherein the lands substantially correspond to said pattern, placing in the mould on said bottom a web of a heat-curable material, superposing on said web a relatively rigid metallic stencil plate having apertures therein in an arrangement exactly corresponding to said pattern and in relation with said lands such that a marginal overlap in plan is provided between the lands and the plate around said recesses and apertures, superposing on said stencil plate a layer of a heat-curable material differing from the first mentioned material, pressing said layer in the mould towards the bottom of the latter until the stencil plate contacts said lands whereby a patch is punched out by the lands from said web into each of the apertures in the stencil plate and until the material of said layer contacts the patches in the apertures, and applying curing heat to the mould whlie maintaining the pressure on said layer thereby to bond the patches to the layer material within said apertures.

References Cited by the Examiner

UNITED STATES PATENTS

| | | | |
|---|---|---|---|
| 2,244,565 | 6/1941 | Nast | 264—245 X |
| 2,922,832 | 1/1960 | Gottschall et al. | 264—248 |

FOREIGN PATENTS

| | | |
|---|---|---|
| 392,794 | 11/1888 | France. |
| 593,015 | 2/1934 | Germany. |

ROBERT F. WHITE, *Primary Examiner.*

S. I. LANDSMAN, *Assistant Examiner.*